United States Patent [19]
Trocino

[11] 3,789,058
[45] Jan. 29, 1974

[54] METHOD OF EXTRACTING WAX FROM BARK

[76] Inventor: Frank S. Trocino, 5070 Donald, Eugene, Oreg. 97405

[22] Filed: Mar. 8, 1972

[21] Appl. No.: 232,944

[52] U.S. Cl. .......................................... 260/412.8
[51] Int. Cl. ............................................. C11b 1/12
[58] Field of Search ................................ 260/412.8

[56] References Cited
UNITED STATES PATENTS

| | | | |
|---|---|---|---|
| 2,554,073 | 5/1951 | Swenson | 260/412.8 |
| 2,662,893 | 12/1953 | Kurth | 260/412.8 |
| 2,781,336 | 2/1957 | Zenczak | 260/412.8 |
| 3,006,938 | 10/1961 | West et al. | 260/412.8 |

*Primary Examiner*—Johnnie R. Brown
*Attorney, Agent, or Firm*—Klarquist, Sparkman, Campbell, Leigh, Hall and Whinston

[57] ABSTRACT

Douglas fir bark is extracted with a hot neutral organic solvent comprising a mixture of an aliphatic and an aromatic hydrocarbon to separate the wax from the bark. The solvent is thereafter removed from the wax to yield a light to dark green wax having a melting point of 60° C., a saponification number of 180–200, an acid number of 50–75 and a hardness of 3–4.

5 Claims, No Drawings

METHOD OF EXTRACTING WAX FROM BARK

CROSS REFERENCE TO RELATED APPLICATION

Method of Separating Bark Components, Ser. No. 232,737, filed Mar. 8, 1972 concurrently herewith by Frank S. Trocino, applicant herein.

BACKGROUND OF THE INVENTION

This invention relates to a method of separating valuable wax products from the bark of trees and, more particularly, to a method of separating such a wax product from the bark of the Douglas fir.

The bark of the Douglas fir is known to contain valuable waxes, and various methods have been provided heretofore for the recovery of the same. In Kurth U.S. Pat. No. 2,662,893, Douglas fir bark is extracted in two steps to obtain different waxes. A first extraction with an aliphatic hydrocarbon solvent obtains a light yellow to light brown wax. A subsequent extraction with an aromatic hydrocarbon solvent or a halogenated aliphatic hydrocarbon solvent obtains a brown to red-brown wax. In my U.S. Pat. No. 3,616,201, I disclosed the solvent extraction of wax from Douglas fir bark as a means of providing an extender for thermosetting adhesives used in the formulation of bonded cellulosic products. I have since discovered that extraction of the bark using a mixture of an aliphatic hydrocarbon and an aromatic hydrocarbon solvent obtains a very valuable wax having characteristics different from the waxes obtained by Kurth and useful in many ways not possible with his.

Accordingly, it is the primary object of the present invention to provide a method of separating wax from Douglas fir bark to provide a wax having physical properties heretofore unobtainable.

It is a further object of the present invention to provide such a method wherein a wax of good hardness is obtained.

SUMMARY OF THE INVENTION

My method of extracting wax comprises reducing the bark to the form of small pieces and extracting the mixture so obtained with a neutral organic solvent comprising a mixture of aliphatic and aromatic hydrocarbon solvents, thereby separating from the bark wax which is soluble in such solvent. The resulting wax solution is then separated from the bark residue and the wax recovered therefrom.

DESCRIPTION OF THE PREFERRED EMBODIMENTS

The first step in my process is to grind Douglas fir bark in a hammermill having a screen with holes about 3/16 inch in diameter. Preferably, the mixture thereby achieved is dried to between about three and eight percent moisture by weight, although this step is not mandatory. Achieving this moisture content is preferable in that it facilitates ultimate recovery of the solvent.

The mixture is then extracted with a neutral organic solvent comprising a mixture of aliphatic and aromatic hydrocarbon solvents to separate the wax from the bark. Preferably, the mixture has a concentration of aromatic hydrocarbons ranging between about 10 and 50 percent. An example of such a solvent which I have found suitable is that sold by Standard Oil Company of California as SOCAL No. 226. This solvent has the following characteristics:

Molecular weight: 98
Vapor density: 3.3
Boiling Point: 50 percent at 208° F., 90 percent at 213° F.
Dry Point: 225° F.
Specific gravity: 6.29 lbs./gal.
Flash cup: closed 24° C.
Aromatics: 11 percent The solvent is heated to a temperature of about 150° F. and is percolated through the mixture of ground bark for about two hours. Preferably the solvent is introduced to the bark in a hopper having a 200 mesh screen at its bottom, the solvent being permitted to flow through the bark by gravity. Solvent passing through the mixture is desirably reheated to 150° F. by a heating coil in a holding tank and thereafter recirculated through the bark for the desired time. The wax laden solvent is thereafter pumped to a falling film evaporator for removal of the solvent from the wax.

The wax obtained has physical characteristics as follows:

Melting point (° C) 60
Saponification number—180–200
Acid Number—50–75
Color—light to dark green Thin-layer and gas-liquid chromatography were used to determine the chemical composition of the wax. The results are as follows:

Monocarboxylic Acids

|  |  | % |
|---|---|---|
| Palmitic | (C16) | 0.478 |
| Stearic | (C18) | 0.183 |
| Arachidic | (C20) | 0.736 |
| Behenic | (C22) | 7.370 |
| N-tricosanoic | (C23) | 0.258 |
| Lignoceric | (C24) | 19.700 |
| M-pentacosanoic | (C25) | 0.256 |
| Cerotic | (C26) | 5.550 |
| M-octacosanoic | (C28) | 0.330 |
| Unidentified |  | 2.140 |
| Sub-total |  | 37.000 |

Dicarboxylic Acids

| | |
|---|---|
| Hexadecanedioic | 2.50 |
| Octadec-enedioic | 1.70 |
| Octadec anedioic | 0.71 |
| Eicosanedioic | 0.51 |
| Docosanedioic | 0.32 |
| Tetracosanedioic | 0.52 |
| Sub-total | 6.26 |

Hydroxy Acids

| | |
|---|---|
| Hydroxy acids | 6.5 |
| Unidentified | 10.0 |
| Sub-total | 16.50 |

Aliphatic Alcohols

|  |  |  |
|---|---|---|
| Stearyl alcohol | (C18) | 0.33 |
| Arachidy alcohol | (C20) | 0.43 |
| Behenyl alcohol | (C22) | 9.93 |
| Lignoceryl alcohol | (C24) | 8.67 |
| Sterols |  | 5.24 |
| Unidentified |  | 1.54 |
| Sub-total |  | 26.14 |
| Phenolic |  | 14.10 |
| Total |  | 100.00 |

The standard ASTM penetration test (100 gram weight at 77° F. for 5 seconds with penetration measured in tenths of a millimeter) indicates the hardness of the wax to be 3–4.

Different samples of Douglas fir bark processed by the method of the invention provide waxes consistent with the above mentioned characteristics.

The wax obtained by the process of the present invention is useful in metallic soaps, polishes such as shoe polishes, floor waxes, automobile waxes, internal lubricants for plastics, carbon paper, and as a wax for use in investment casting.

I claim:

1. A process for the recovery of wax products from the bark of Douglas fir trees comprising extracting the bark with a neutral organic solvent comprising a mixture of aliphatic and aromatic hydrocarbons having a boiling point below 225° F. and having a concentration of aromatic hydrocarbons ranging between about 10 and 50 percent to separate from the bark a wax product which is soluble in said solvent; and evaporating said solvent from said wax solution to recover said wax.

2. The process of claim 1 further comprising initially reducing the bark to the form of small pieces and percolating the solvent through said pieces.

3. The process of claim 2 in which said solvent is percolated through said bark pieces for about 2 hours.

4. The process of claim 2 in which said solvent is at a temperature of about 150° F.

5. The process of claim 1 in which said bark is dried to a moisture content between about three and eight percent by weight prior to extracting the same.

* * * * *